United States Patent Office 3,396,192
Patented Aug. 6, 1968

3,396,192
METHOD OF PREPARING 5-(γ-DIMETHYLAMINO-PROPYLIDENE) - 5H - DIBENZO[a,d] - 10,11 - DIHYDROCYCLOHEPTENE
Norman L. Wendler, Summit, and David Taub, Metuchen, N.J., assignors to Merck & Co., Inc., Rahway, N.J., a corporation of New Jersey
No Drawing. Filed Feb. 2, 1965, Ser. No. 429,922
2 Claims. (Cl. 260—570.8)

ABSTRACT OF THE DISCLOSURE

A method of preparing 5 - (γ - dimethylaminopropylidene)-5H-dibenzo[a,d]-10,11-dihydrocycloheptene by reaction of 5-methyl-5H-dibenzo[a,d]-10,11-dihydrocycloheptene with bromine to produce the corresponding bromomethylene derivative, followed by reaction of the bromomethylene derivative with magnesium to produce the corresponding Grignard reagent and reacting said Grignard reagent with dimethylaminoethyl chloride in the presence of tetrahydrofuran to produce the desired product.

This invention relates to derivatives of dibenzocycloheptenes. In particular, the invention is concerned with an improved method of preparing the compound 5-(γ-dimethylaminopropylidene)-5H-dibenzo[a,d] - 10,11 - dihydrocycloheptene, which is known to be useful in the field of mental health. The invention is also concerned with intermediates useful in preparing the above compound.

The process of the invention may be illustrated as follows:

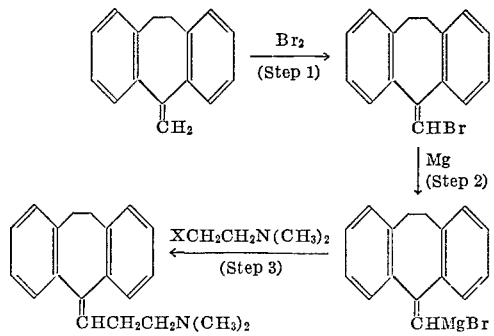

wherein X represents chlorine or bromine.

As illustrated above, the first step of the process involves the reaction of 5-methylene-5H-dibenzo[a,d]-10,11-dihydrocycloheptene with bromine in an inert organic solvent. The solvent of choice is chloroform. However, this particular solvent employed is not critical and other inert organic solvents such as methylene chloride, carbon tetrachloride and the like may be used. The temperature at which the reaction is conducted is not critical. However, since the reaction proceeds rapidly at room temperature, it is preferred to carry out the reaction at about room temperature or below, i.e., from about 5 to 30° C. The bromomethylene derivative is readily recovered in conventional manner.

The formation of the Grignard reagent by the reaction of the bromoethylene derivative with magnesium (Step 2) is carried out in the presence of substantially anhydrous tetrahydrofuran as a solvent and preferably at an elevated temperature. However, the temperature at which the reaction is carried out is not critical and the reaction can be carried out at a temperature of from about 40° C. up to the reflux temperature of the system. Recovery of the product is accomplished in conventional manner.

The last step of the process (Step 3) involves the coupling of the Grignard reagent with the dimethylaminomethyl halide. This reaction is conveniently effected in a suitable inert organic solvent, preferably tetrahydrofuran, and at elevated temperatures. However, neither the solvent or temperature employed is critical and the conventional solvents and temperatures heretofore employed for carrying out coupling reactions with Grignard reagents may be utilized. Recovery of the product is accomplished using conventional techniques.

The 5-methylene-5H-dibenzo[a,d] - 10,11-dihydrocycloheptene employed as the starting material may be prepared as described by W. Treibs and H. J. Klinkhammer, Ber., 83, 367 (1950).

The following examples are illustrative of the process of this invention.

EXAMPLE 1

5-bromomethylene-5H-dibenzo[a,d]-10,11-dihydrocycloheptene

A solution of 1.85 g. of 5-methylene-5H-dibenzo[a,d]-10,11-dihydrocycloheptene in 15 cc. of chloroform is brominated by dropwise addition of 1.45 g. of bromine dissolved in 9 cc. of chloroform. Bromine absorption is instantaneous, accompanied by copious evolution of hydrogen bromide. The reaction mixture is evaporated to dryness and crystallized from petroleum ether, wt. 2.5 g., M.P. 70–72° C. A sample crystallized for analysis melted at 73–75° C.

Analysis.—Calcd. for $C_{16}H_{13}Br$: C, 67.37; H, 4.56; Br, 28.08. Found: C, 66.98; H, 4.46; Br, 28.17.

EXAMPLE 2

5-(γ-dimethylaminopropylidene)-5H-dibenzo[a,d]-10,11-dihydrocycloheptene hydrochloride A solution of 2.00 g. of 5-bromomethylene-5H-dibenzo[a,d]-10,11-dihydrocycloheptene in 10 ml. of tetrahydrofuran is added slowly under nitrogen to a stirred mixture of 170 mg. of magnesium turnings and 2 ml. of tetrahydrofuran. The reaction is started by initially adding a trace of methyl iodide. When addition is complete, the dark brown solution is refluxed for 90 minutes. It is then cooled to room temperature and a solution of 760 mg. of β-dimethylaminoethyl chloride is added. The stirred mixture is refluxed 2 hours, kept at room temperature overnight, and then cooled to 10° C. 20 ml. of 10% aqueous ammonium chloride and 10 ml. of 2.5 N hydrochloric acid are then added. Following ether extraction of the mixture to recover by-products, the acidic layer is made basic with 2.5 N sodium hydroxide and extracted with ether. From the latter extract, 230 mg. of basic material is obtained which, on treatment with hydrogen chloride in ether and crystallization from ether, gives 170 mg. of 5-(γ-dimethylaminopropylidene) - 5H - dibenzo[a,d] - 10,11 - dihydrocycloheptene hydrochloride, M.P. 175–190° C., rising to 192–194° C. after one recrystallization from ether-isopropanol, M.P. 192–194° C. On admixture with an authentic sample, M.P. 192–194° C., there is no M.P. depression and the respective infrared spectra are identical.

We claim:
1. A method for preparing 5-(γ-dimethylaminopropylidene) - 5H - dibenzo[a,d] - 10,11 - dihydrocycloheptene, which comprises the steps of
   (1) reacting 5 - methylene - 5H - dibenzo[a,d] - 10,11-dihydrocycloheptene with bromine in the presence of an inert organic solvent to form the compound 5 - bromomethylene - 5H - dibenzo[a,d] - 10,11-dihydrocycloheptene;
   (2) reacting the compound obtained in step (1) with magnesium in the presence of substantially anhy- drous tetrahydrofuran to form the Grignard reagent thereof; and (3) reacting the Grignard reagent obtained in step (2) with a dimethylaminoethyl halide of the formula $(CH_3)_2NCH_2CH_2X$, wherein X is a halogen having an atomic weight greater than 35 and less than 80, in the presence of an inert organic solvent.

2. A method for preparing 5-($\gamma$-dimethylaminopropylidene) - 5H - dibenzo[a,d] - 10,11 - dihydrocycloheptene, which comprises the steps of (1) reacting 5 - methylene - 5H - dibenzo[a,d] - 10,11-dihydrocycloheptene with bromine in the presence of chloroform to form the compound 5-bromomethylene-5H-dibenzo[a,d]-10,11-dihydrocycloheptene;

(2) reacting the compound obtained in step (1) with magnesium in the presence of substantially anhydrous tetrahydrofuran to form the Grignard reagent thereof; and (3) reacting the Grignard reagent obtained in step (2) with dimethylaminoethyl chloride, in the presence of tetrahydrofuran.

References Cited

UNITED STATES PATENTS 2,432,905  12/1947  Charasch et al. _ 260—570.8 XR

OTHER REFERENCES

Curtin et al., "Journal American Chemical Society," vol. 81, pages 4719–4728 (1959).

CHARLES B. PARKER, *Primary Examiner.*

ROBERT V. HINES, *Assistant Examiner.*